United States Patent [19]
Saji

[11] Patent Number: 5,241,591
[45] Date of Patent: Aug. 31, 1993

[54] TELEPHONE SYSTEM HAVING A DIAL DATA CHANGEOVER SWITCH

[75] Inventor: Mitsuro Saji, Kyoto, Japan

[73] Assignee: Rohm Co., Ltd., Kyoto, Japan

[21] Appl. No.: 708,708

[22] Filed: May 31, 1991

[30] Foreign Application Priority Data

Jun. 1, 1990 [JP] Japan .................... 2-143925

[51] Int. Cl.⁵ .......................................... H04M 19/00
[52] U.S. Cl. .................................... 379/361; 379/413; 379/387; 379/362
[58] Field of Search ............... 379/352, 355, 356, 359, 379/361, 362, 413, 324, 387

[56] References Cited

U.S. PATENT DOCUMENTS

| | | | |
|---|---|---|---|
| 3,686,444 | 8/1972 | Stevenson | 379/387 X |
| 4,272,650 | 6/1981 | Bolgiano et al. | 379/387 X |
| 4,532,382 | 7/1985 | Pommer, II | 379/413 X |
| 4,636,588 | 1/1987 | Nakayama et al. | 379/362 |
| 4,691,344 | 9/1987 | Brown et al. | 379/413 X |
| 4,847,899 | 7/1989 | Hikida | 379/413 |
| 4,961,220 | 10/1990 | Tentler et al. | 379/413 |
| 4,984,267 | 1/1991 | Martinez | 379/413 |
| 5,014,308 | 5/1991 | Fox | 379/413 |
| 5,042,066 | 8/1991 | Ikefuji | 379/413 |

FOREIGN PATENT DOCUMENTS

| | | | |
|---|---|---|---|
| 0346243 | 12/1989 | European Pat. Off. | |
| 2425603 | 12/1975 | Fed. Rep. of Germany | 379/387 |
| 61-013745 | 1/1986 | Japan | |
| 61-127268 | 6/1986 | Japan | |
| 0173559 | 8/1986 | Japan | 379/387 |
| 1094745 | 4/1989 | Japan | |
| 1542710 | 3/1979 | United Kingdom | 379/387 |

OTHER PUBLICATIONS

Nishino, "Special Requirements and LSIs For Telephone Sets", IEEE Transactions On Consumer Electronics, vol. CE-33, No. 3, Aug. 1987, pp. 413–422.

Primary Examiner—James L. Dwyer
Assistant Examiner—M. Shehata
Attorney, Agent, or Firm—Fish & Richardson

[57] ABSTRACT

A telephone system having a dial data changeover switch transmits either a dial pulse signal or a dual-tone multifrequency signal along a telephone line. This telephone system includes a changeover switch for changing between a KEY signal from a key board and a control signal from a CPU. When a power interruption sensing device senses that the external power voltage is below a predetermined voltage, the changeover switch shunts from the control signal to the KEY signal and transmits either the DTMF signal or the DP signal along the telephone line.

3 Claims, 2 Drawing Sheets

TELEPHONE SYSTEM HAVING A DIAL DATA CHANGEOVER SWITCH

BACKGROUND OF THE INVENTION

1. Field of the Invention

This invention relates to a telephone system, and more particularly to a multifunction telephone system having functions such as a facsimile transmission and automatic recording.

2. Description of the Related Arts

In recent years, with the progress in the public telephone network, the development of telephone systems having the functions of facsimile transmission and automatic recording have been popular. In this type of telephone system, it is necessary to incorporate a central processing unit (hereinafter referred to as a CPU) having the capacity of processing signals in order to realize the apparatus compact in size and having a lot of functions.

FIG. 2 of the accompanying drawings is a schematic diagram showing the circuit configuration of a conventional telephone system. A KEY signal output from a key board 3 of a telephone system 1 is transferred to a CPU 4 which controls the operation of the entire telephone system. The CPU 4 outputs a CPU signal, which is a control signal, to an input controller 21 in a selected signal transmitter circuit 2 in response to the input of the KEY signal.

The selected signal transmitter circuit 2 consists of a single-chip large scale integrated circuit (hereinafter referred to as an LSI), and the input controller 21 outputs dial data to both a dual-tone multifrequency (hereinafter referred to as a DTMF) signal generator 24 and an output controller 25 in response to the CPU signal. The DTMF signal generator 24 outputs a DTMF signal composed of a combination of two frequencies on the basis of the input dial data along a telephone line. At the same time, the output controller 25 outputs a dial pulse (hereinafter referred to as a DP) signal along the telephone line on the basis of the input dial data. The selected signal transmitter circuit 2 further includes a memory 23 which stores the dial data output from the input controller 21 and outputs the dial data that has been stored and is read out again at the time of redialing to both the DTMF generator 24 and the output controller 25.

The controller CPU 4 is driven by an external power supply of +5 V, while each component in the selected signal transmitter circuit 2 is driven by a telephone line current acquired from the telephone line via a resistor 29 and a diode 28.

Thus, in the conventional telephone system 1, the CPU 4 processes the KEY signal entered from the key board 3 and outputs a control signal to the selected signal transmitter circuit 2, and then transmits either the DTMF signal or the DP signal along the telephone line. In the case where the external power supply drops due to, for example, a power failure, the CPU 4 will not operate on the telephone line current due to the large power dissipation of the CPU.

As alternatives, it may be considered that the KEY signal is directly delivered from the key board 3 to the input controller 21 in the selected signal transmitter circuit 2. In such a circuit configuration, however, it is difficult to effect a compaction function by which a given telephone number is defined by a predetermined compacted telephone number and output to the input controller 21 because the KEY signal is not processed by the CPU 4.

SUMMARY OF THE INVENTION

This invention aims to overcome aforementioned drawbacks in the prior art, and an object of this invention is to provide a telephone system which is capable of transmitting a selected signal by the use of the telephone line current even if the external power supply is interrupted and capable of transmitting the selected signal and changing the definition of the KEY signal from the key board when the external power is normal.

To this aim, according to one aspect of this invention, there is provided a telephone system comprising: a power interruption sensing means for sensing that the external power supply drops below a predetermined level; a selected signal transmitting means for transmitting either the DP signal or the DTMF signal along the telephone line by the use of either the KEY signal from the key board or the control signal from the CPU in response to the sensing signal from the power interruption sensing means; and a diode switch for switching the power of the selected signal transmitting means from the external power supply to the telephone line current if the external power supply drops to a level below a predetermined value.

Namely, if the external power drops to a level less than a predetermined value, the power supply of the selected signal transmitting means is switched to the telephone line current, and then either the DP signal or the DTMF signal is transmitted along the telephone line by the use of the KEY signal from the key board. Meanwhile, if the external power supply voltage is in a normal voltage range which is above a predetermined value, the selected signal transmitting means is driven by the external power supply and outputs either the DP signal or the DTMF signal along the telephone line.

BRIEF DESCRIPTION OF THE DRAWINGS

The novel features believed characteristic of the invention are set forth in the appended claims. The invention itself, however, as well as other features and advantages thereof will be best understood by reference to the detailed description which follows, read in conjunction with the accompanying drawings, wherein:

DETAILED DESCRIPTION OF THE PREFERRED EMBODIMENTS

Figure 1:
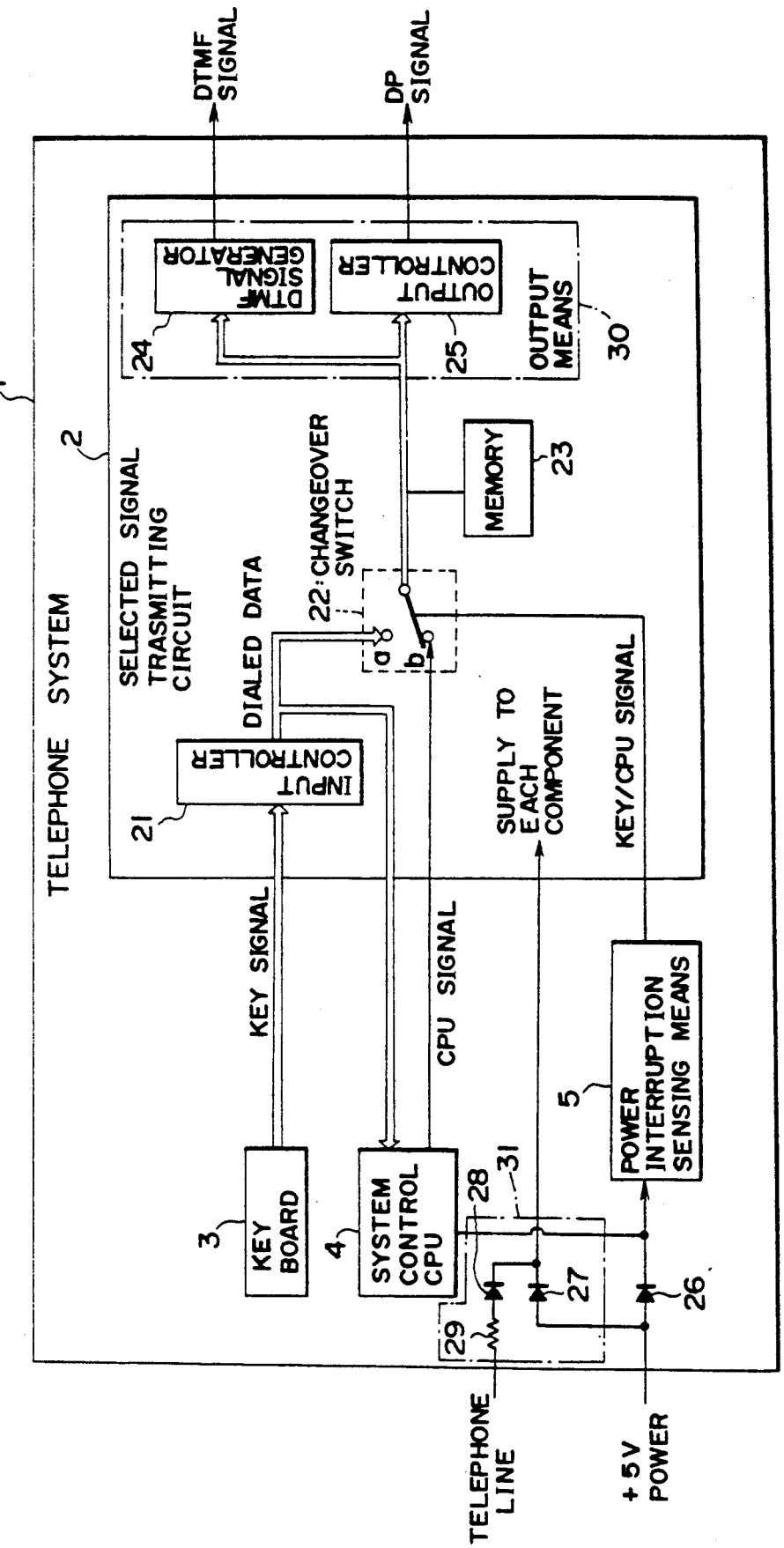
FIG. 1 is a block diagram showing the circuit configuration of a telephone system according to this invention.
Figure 2:
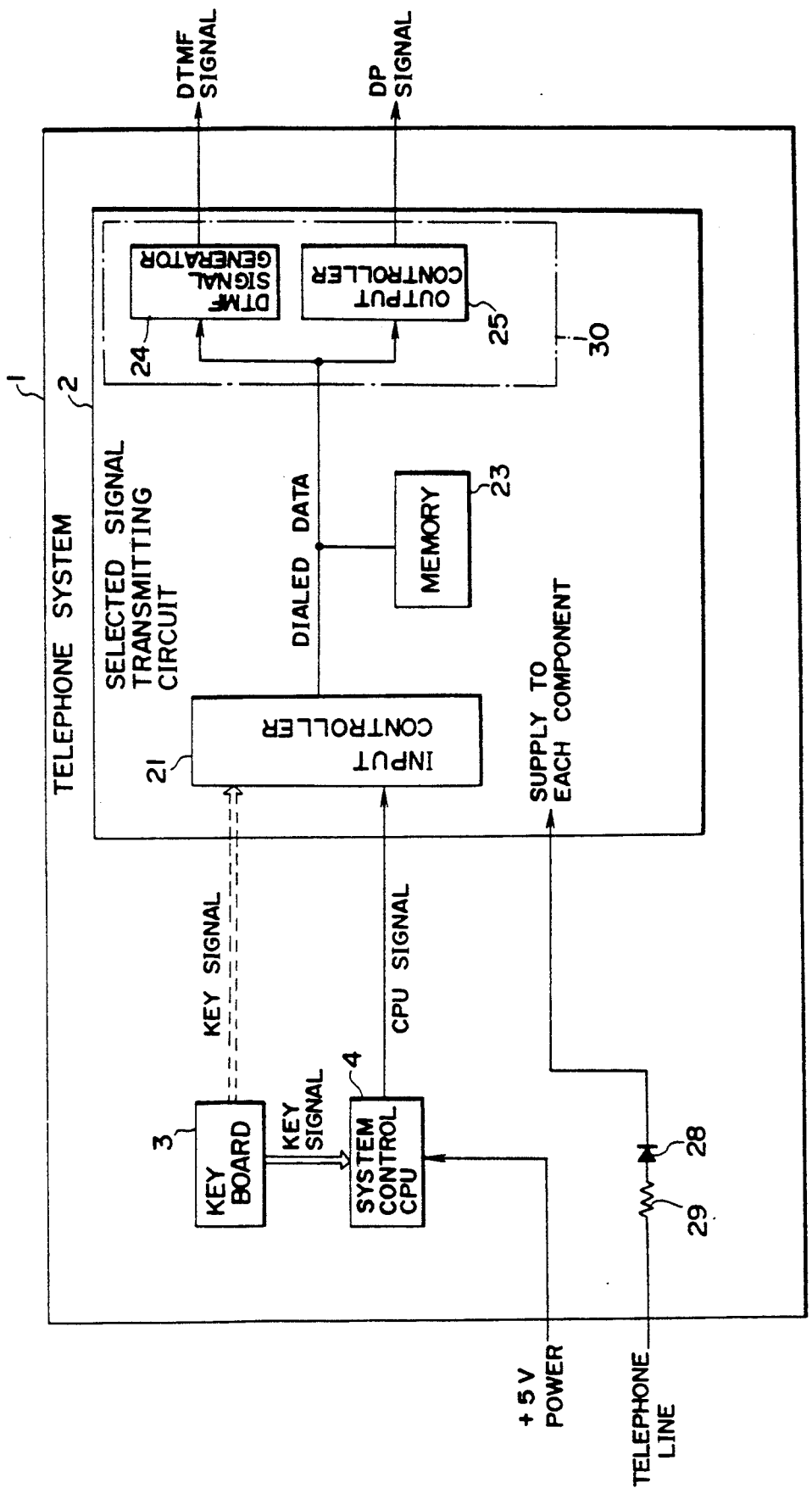
FIG. 2 is a block diagram showing the circuit configuration of a conventional telephone system.

Referring to the accompanying drawings, a telephone system embodying the present invention will be described hereunder. FIG. 1 is a block diagram showing the circuit configuration of the telephone system according to one embodiment of this invention. A KEY signal entered from a key board 3 is transferred to an input controller 21 inside of a selected signal transmitting circuit 2. The input controller 21 distributes the received KEY signal as dial data, and outputs one of the distributed dial data to a CPU 4 for controlling the telephone system 1. The CPU 4 outputs a CPU signal at the "b" terminal of a changeover switch 22 in the selected signal transmitting circuit 2. The remaining dial data that is distributed by the input controller 21 is transferred to the "a" terminal of the changeover switch 22.

This changeover switch 22 is connected to a DTMF signal generator 24, an output controller 25 and a memory 23. The telephone system 1 also includes a power interruption sensing means 5, which is connected to an external power +5 V via a diode 26, for sensing the voltage drop in an external power supply to a value below a predetermined value. The changeover switch 22 is controlled by a KEY/CPU signal representative of the sensing signal from the power interruption sensing means 5. Namely, if the power supply voltage is below a predetermined level, the changeover switch 22 changes a contact point thereof to the side "a" in order to output the dial data from the input controller 21, whilst if the power supply voltage is above a predetermined level, the changeover switch 22 switches the contact point to the side "b" to issue the CPU signal from the CPU 4.

The dial data output from the changeover switch 22 is transferred to both the DTMF signal generator 24 and the output controller 25, and then either a DTMF signal or a DP signal is transmitted along the telephone line. The dial data from the changeover switch 22 is stored in the memory 23, and in the case of redialing, this dial data is read out and output to both the DTMF signal generator 24 and the output controller 25.

A drive current is supplied to both the CPU 4 and each component in the selected signal transmitting circuit 2 by way of diodes 26 and 27, respectively. Each component in the selected signal transmitting circuit 2 has an alternative power supply of a telephone line current acquired from the telephone line through a resistor 29 and a diode 28. These diodes 27, 28 and the resistor 29 constitute a diode switch 31. With such a circuit configuration, if the power supply drops below a predetermined voltage, the telephone line current is supplied to the selected signal transmitting circuit 2 via the resistor 29 and the diode 28, and then, by the use of the KEY signal from the key board 3 along the telephone line, either the DTMF signal or the DP signal will be transmitted.

Thus, in the embodiment of the present invention, even if the CPU becomes inoperative due to the voltage drop in the external power supply, it is possible to transmit the DTMF signal and the DP signal by the utilization of the telephone line current, and when the external power supply is in a normal range, it is possible to change the definition of the KEY signal by processing the KEY signal from the key board with the CPU.

What is claimed is:

1. A telephone system comprising:
    (a) a key board;
    (b) a central processing unit for issuing a signal in response to a signal entered from the key board;
    (c) a power interruption sensing means for sensing when a voltage level of an external power supply drops below a predetermined level;
    (d) a selected signal transmitting means comprising a changeover switching means for outputting either the signal from the key board or the signal from the central processing unit in response to a signal from the power interruption sensing means, and an output means for outputting either a dual-tone-multi-frequency signal or a dial pulse signal in response to the output from the changeover switching means; and
    (e) a switching means for switching a drive current supply of the selected signal transmitting means from the external power supply to a telephone line current;
    wherein said changeover switching means applies the signal from the central processing unit to the output means when the voltage level of the external power supply is above the predetermined level and applies the signal from the key board to the output means when the voltage level of the external power supply is below the predetermined level.

2. A telephone system according to claim 1, wherein the selected signal transmitting means further includes an input controller which distributes the signal from the key board to the changeover switching means and to the central processing unit.

3. A telephone system according to claim 1, wherein the switching means comprises a plurality of diodes connected with each other in parallel.

* * * * *